UNITED STATES PATENT OFFICE.

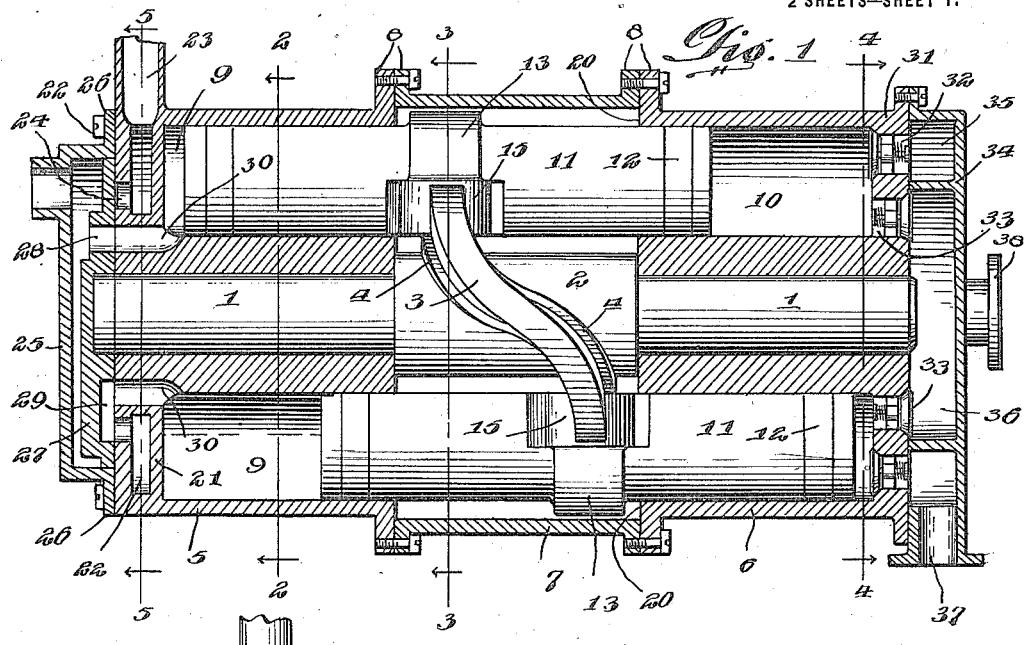

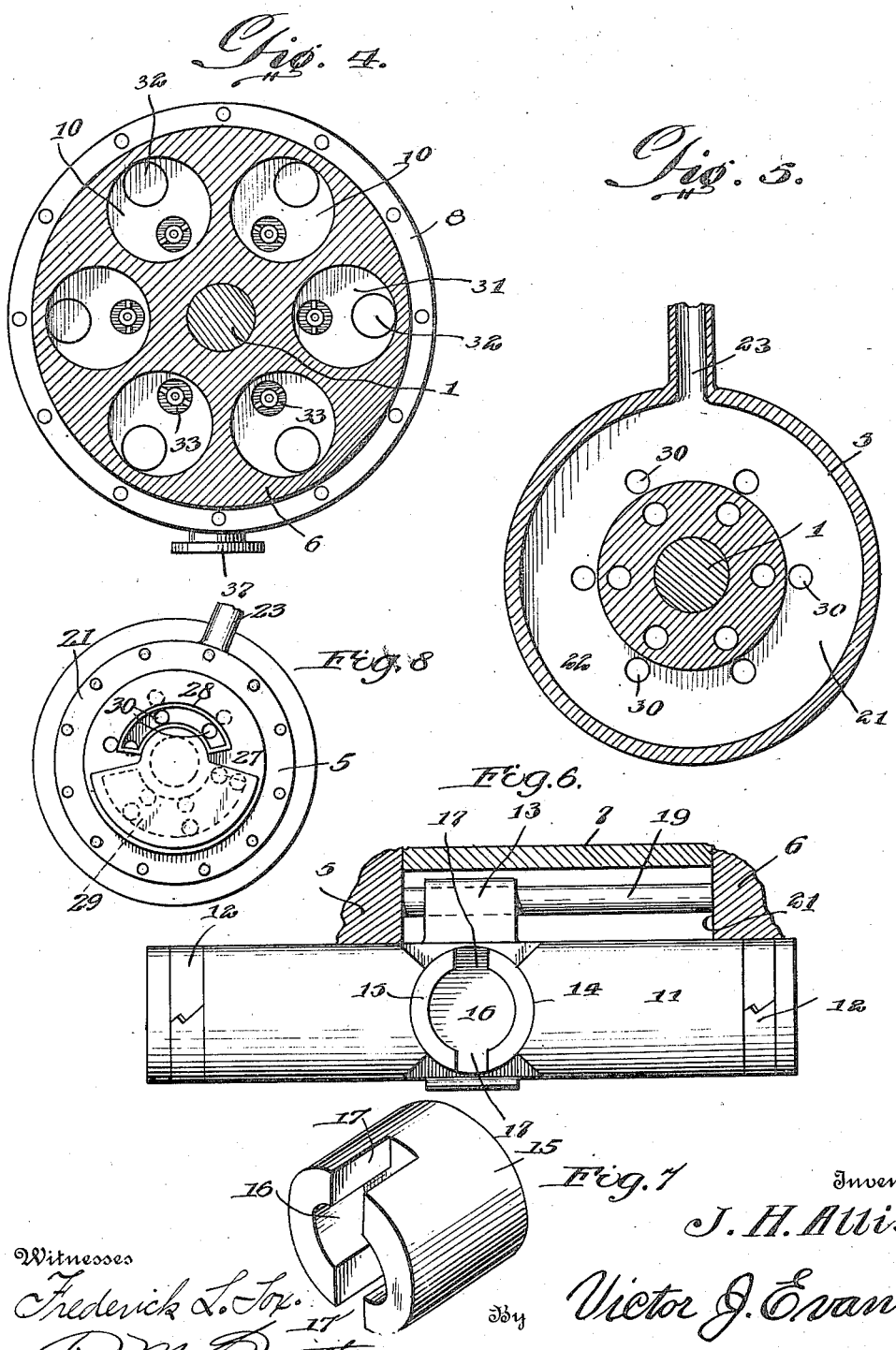

JESSE H. ALLISON, OF EL PASO, TEXAS, ASSIGNOR OF TWENTY-FIVE ONE-HUNDREDTHS TO JOSEPH F. ALLISON AND TEN ONE-HUNDREDTHS TO EDWARD DUGAN, BOTH OF EL PASO, TEXAS.

PUMPING-ENGINE.

1,229,009.   Specification of Letters Patent.   Patented June 5, 1917.

Application filed June 7, 1915.   Serial No. 32,691.

*To all whom it may concern:*

Be it known that I, JESSE H. ALLISON, a citizen of the United States, residing at El Paso, in the county of El Paso and State of Texas, have invented new and useful Improvements in Pumping-Engines, of which the following is a specification.

This invention relates to pumping engines or, in other words, a combined engine and pump for pumping air, water, oil or other agents and being especially designed for use upon locomotives in connection with the air pumps thereof and also for use upon automobiles for inflating the tires, for pumping water in steam operated machines, for compressing air for self-starting purposes and for various other uses which will suggest themselves to the manufacturer.

One of the principal objects of the invention is to produce a pump having a free, smooth and flexible movement free from all pounds, knocks and sudden shocks and thereby greatly increasing the life and durability as well as maintaining the efficiency of the pump, the construction of which is simple, the operation thereof noiseless and the construction of such a nature as to allow of high speed without liability of the few parts getting out of order and requiring repair work.

With the above and other objects in view, the invention consists in the novel construction, combination and arrangement of parts, as herein described, illustrated and claimed.

In the accompanying drawings:—

Figure 1 is a longitudinal section through a pumping engine embodying the present invention showing certain parts thereof in elevation such as the cam and its shaft and two of the pistons.

Fig. 2 is a cross section on the line 2—2 of Fig. 1.

Fig. 3 is a cross section on the line 3—3 of Fig. 1.

Fig. 4 is a cross section on the line 4—4 of Fig. 1.

Fig. 5 is a cross section on the line 5—5 of Fig. 1.

Fig. 6 is an inside face view of one of the pistons, showing the guiding means therefor and one of the oscillatory cam shoes.

Fig. 7 is a detail perspective view of one of the cam shoes.

Fig. 8 is a face view on a reduced scale showing the steam inlet and exhaust valve.

1 designates a rotary shaft the central portion of which is enlarged in cylindrical form as shown at 2 and formed with a cam rib 3 having reversely operating portions the purpose of which will hereinafter appear, 4 designating shoulders or tracks for supporting the cam shoes hereinafter particularly described.

In conjunction with the rotary shaft 1 and the cam carried thereby, I employ two cylinder blocks, 5 designating the engine cylinder block and 6 the pump cylinder block. The blocks 5 and 6 are arranged at opposite sides of and coupled together by a centerpiece or yoke 7, all of the members 5, 6 and 7 being exteriorly cylindrical as indicated in the cross sectional views and being preferably formed separately from each other and flanged as shown at 8 and bolted or riveted or otherwise fastened together.

The engine block 5 is bored to form an annular series of engine cylinders 9 as shown in Fig. 2 and the pump cylinder block is likewise bored to form an annular series of pump cylinders 10 as shown in Fig. 4. The two blocks 5 and 6 of cylinders are so arranged that the cylinders of one block are in opposed relation and longitudinal alinement with those of the other.

In each opposed pair of cylinders there is arranged a double headed piston 11 or, in other words, a piston both heads of which are adapted for operation in the respective cylinders, the piston being provided adjacent to its opposite ends with piston rings 12 for the usual purpose. The drawings indicate the employment of six pistons and twelve cylinders or two blocks of six cylinders each but it will of course be understood that the number of cylinders may be increased or diminished at the will of the manufacturer. Each of the cylinders, as shown in Fig. 6, is provided on its inner face or that side which is next to the cam 3 with an enlargement or reinforcement 13 and at this point, which is about midway between the ends of the piston, the latter is formed with a cylindrical step or recess 14 in which is placed an oscillatory cam shoe 15 the same being shown as provided with a central bore 16 for the sake of lightness and a diametrical slot 17 adapted to receive the cam rib 3, the said shoe and rib thus having a sliding relation to each other while the shoe is adapted to oscillate in the recess 14 in order to adjust itself to the varying angles necessarily assumed thereby in the reciprocatory movement of each piston, all of the pistons moving in planes parallel to the axis of the shaft 1. The enlargement or reinforcement 13 is extended to a greater extent on one side of the piston than on the other and is formed with a hole 18 which receives a guide rod 19 supported at its extremities by lugs or flanges 20 on the inside of the centerpiece or yoke 7. The guide rods 19 prevent the pistons 11 from turning and thereby maintain the proper engagement between the cam rib 3 and the shoes 17.

The head 21 of the engine cylinder block 5 is formed with an exhaust chamber 22 therein with which is connected an exhaust pipe 23, the chamber 22 being in communication by means of ports 24 with a valve chest 25 preferably formed separately from the adjacent cylinder block and flanged as shown at 26 to adapt the same to be fixedly secured thereto. Within the chest 25 is a rotary disk-shaped valve 27 which is fast on and carried by the shaft 1. The valve 27 as illustrated in Fig. 8 is provided with an arcuate inlet port 28 and an arcuate exhaust port 29, the exhaust port 29 being adapted to register simultaneously with a plurality of the exhaust ports 24 above referred to while the inlet port 28 is adapted to register simultaneously with a plurality of the cylinder inlet ports 30.

Each of the cylinders 10 of the pump cylinder block 6 is provided in the head 31 thereof with an inlet valve 32 and an outlet valve 33. Beyond the head 31 is arranged a chambered head 34 having an inlet passage 35 and an outlet or discharge passage 36, said head 34 being provided with an inlet nozzle or connection 37 and an outlet nozzle or connection 38.

The operation of the pumping engine may be described as follows: Assuming that steam is employed, the steam is admitted successively to the annular series of cylinders 9 through the inlet port 28 of the valve 27 as the latter is revolved by means of the shaft 1. The pistons 11 are thus successively acted upon and driven toward the pumping end of the device thereby forcing out the liquid or fluid being pumped. As the pistons 11 are forced in the direction just referred to, the shoes 15 coöperate with the cam rib 3 and impart rotary motion to the shaft 1. The return strokes of the pistons are effected by means of the cam rib 3 coöperating with the shoes 15 and in such return strokes, the steam is exhausted through the port 29 of the rotary valve 27. In such return movement of the pistons, the valves 32 of the pump cylinders open to admit a new charge of liquid or fluid in accordance with the agent upon which the pump is acting. It will thus be seen that the pistons and the cam mutually coöperate and assist each other in the proper functioning or operation of the mechanism involved, the pistons serving to revolve the shaft and the shaft operating to effect the return strokes of the pistons. The pistons are operated upon successively throughout the annular series thereof and they therefore successively coact with the cam to impart rotary motion to the shaft 1. The cam also successively acts upon the pistons to effect the return stroke thereof. This is productive of an unusually smooth operation of the pumping engine as a whole, eliminating pounds, knocks and other shocks and vibrations so frequently found in pumps of the present day construction. The construction of the elements of the pump insures long life and durability, the engine may be operated by steam, compressed air or other expansive fluid and may be used for pumping any fluid or liquid.

What I claim is:—

The combination of a rotary shaft, an annular series of cylinders encircling said shaft and having their major axes parallel to the axis of said shaft, reciprocatory pistons in said cylinders, shoes carried by said pistons and arranged for oscillatory movement in relation thereto on axes perpendicular to the path of movement of the pistons, said shoes being formed with diametrical slots, and a cam on said shaft having a spiral projecting thread designed and arranged in such coöperative relation to the slots of the shoes of said pistons that the cam and pistons alternately act to produce a rotary motion of the shaft and a reciprocatory movement of the pistons.

In testimony whereof I affix my signature in presence of two witnesses.

JESSE H. ALLISON.

Witnesses:
 B. G. DURHAM,
 F. WESSEL.